(12) United States Patent
Denk et al.

(10) Patent No.: US 10,775,228 B2
(45) Date of Patent: Sep. 15, 2020

(54) KITCHEN SCALE DESIGNED FOR MOISTURE TO PENETRATE THERETHROUGH AND EXIT THEREFROM

(71) Applicant: LEIFHEIT AG, Nassau (DE)

(72) Inventors: André Denk, Muelheim an der Ruhr (DE); Patrick Spielbusch, Koblenz (DE); Christian Moddick, Drensteinfuhrt (DE); Artjom Emter, Koblenz (DE)

(73) Assignee: LEIFHEIT AG, Nassau (DE)

( * ) Notice: Subject to any disclaimer, the term of this patent is extended or adjusted under 35 U.S.C. 154(b) by 220 days.

(21) Appl. No.: 15/756,702

(22) PCT Filed: Sep. 2, 2016

(86) PCT No.: PCT/EP2016/070750
§ 371 (c)(1),
(2) Date: Mar. 1, 2018

(87) PCT Pub. No.: WO2017/037249
PCT Pub. Date: Mar. 9, 2017

(65) Prior Publication Data
US 2018/0245968 A1 Aug. 30, 2018

(30) Foreign Application Priority Data
Sep. 3, 2015 (DE) .................... 20 2015 104 676 U

(51) Int. Cl.
| G01G 21/28 | (2006.01) |
| G01G 3/14 | (2006.01) |
| G01G 21/23 | (2006.01) |
| G01G 23/36 | (2006.01) |

(52) U.S. Cl.
CPC .............. *G01G 21/28* (2013.01); *G01G 3/14* (2013.01); *G01G 21/23* (2013.01); *G01G 23/361* (2013.01)

(58) Field of Classification Search
CPC .......... G01G 21/28; G01G 3/14; G01G 21/23; G01G 23/361; G01G 21/30
USPC ....................................................... 177/238
See application file for complete search history.

(56) References Cited

U.S. PATENT DOCUMENTS

| 3,089,107 A | * | 5/1963 | Dean, III | G01L 1/2287 338/2 |
| 3,444,943 A | * | 5/1969 | Tytus | G01G 21/28 177/180 |
| 3,599,139 A | * | 8/1971 | Low | G01L 1/2287 338/2 |
| 3,828,295 A | * | 8/1974 | Bradley | G01L 1/2287 338/6 |

(Continued)

FOREIGN PATENT DOCUMENTS

DE 102011051612 A1 1/2013

*Primary Examiner* — Randy W Gibson
(74) *Attorney, Agent, or Firm* — Vivacqua Crane, PLLC

(57) ABSTRACT

The invention relates to a kitchen scale comprising a carrying plate (1), a substructure (2) supporting the carrying plate, weighing cells (6) comprising at least one strain gauge (10), an electronics unit (4), which is capable of computing the weight of the load, and comprising a display device for displaying the ascertained weight and a battery compartment for accommodating a voltage source which supplies the electronics unit (4) with power. The weighing cell (6) has at least one strain gauge, which is at least partially provided with a parylene coating.

20 Claims, 1 Drawing Sheet

(56) References Cited

U.S. PATENT DOCUMENTS

Figure 1:
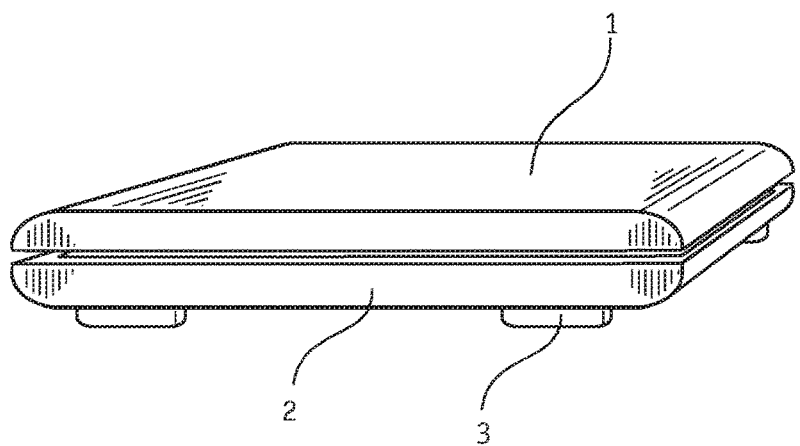

| | | | | |
|---|---|---|---|---|
| 3,940,730 A * | 2/1976 | Brewer | G01L 1/2287 | 338/2 |
| 4,285,412 A * | 8/1981 | Wirth | G01G 21/30 | 177/179 |
| 4,327,350 A * | 4/1982 | Erichsen | H01C 10/10 | 338/4 |
| 4,343,197 A * | 8/1982 | Suzuki | G01L 1/2287 | 338/2 |
| 4,526,246 A * | 7/1985 | Patoray | G01G 21/28 | 177/179 |
| 4,549,439 A * | 10/1985 | Keen | G01G 3/1402 | 338/2 |
| 4,884,645 A * | 12/1989 | Knothe | G01G 21/28 | 177/180 |
| 4,957,177 A * | 9/1990 | Hamilton | G01G 3/1412 | 177/179 |
| 5,869,788 A * | 2/1999 | Gordon | G01G 3/1414 | 174/365 |
| 5,895,894 A * | 4/1999 | Zumbach | G01G 21/30 | 177/124 |
| 6,359,239 B1 * | 3/2002 | Missler | A47J 47/005 | 177/177 |
| 6,433,289 B1 * | 8/2002 | Gurr | G01G 21/06 | 177/238 |
| 6,923,449 B2 * | 8/2005 | Burkhard | G01G 21/30 | 177/180 |
| 7,002,084 B2 * | 2/2006 | Cox | H05K 5/06 | 177/238 |
| 7,112,750 B2 * | 9/2006 | Emery | G01G 21/30 | 177/180 |
| 7,411,137 B2 * | 8/2008 | Sandberg | B26D 7/00 | 177/154 |
| 7,497,137 B2 * | 3/2009 | Tellenbach | G01G 21/30 | 73/865.9 |
| 8,055,456 B2 * | 11/2011 | Loher | G01G 23/3728 | 702/41 |
| 8,525,051 B2 * | 9/2013 | Hauck | G01G 21/28 | 177/124 |
| 8,796,565 B2 * | 8/2014 | Lauer | G01G 21/28 | 177/243 |
| 9,046,408 B2 * | 6/2015 | Chan | G01G 3/14 | |
| 9,612,151 B2 * | 4/2017 | Tachibana | G01G 21/30 | |
| 9,719,843 B2 * | 8/2017 | Thirouin | G01G 21/28 | |
| 2005/0155435 A1 | 7/2005 | Ziebart et al. | | |
| 2008/0245580 A1 * | 10/2008 | Aby-Eva | G01G 21/283 | 177/238 |
| 2016/0069737 A1 * | 3/2016 | Canwell | G01G 21/28 | 177/238 |
| 2016/0290853 A1 * | 10/2016 | Tachibana | G01G 21/30 | |

* cited by examiner

KITCHEN SCALE DESIGNED FOR MOISTURE TO PENETRATE THERETHROUGH AND EXIT THEREFROM

CROSS-REFERENCE TO RELATED APPLICATIONS

This application is a national stage application under 35 U.S.C. 371 of international application number PCT/EP2016/070750 filed on Sep. 2, 2016. The entire disclosure of the above application is hereby incorporated by reference.

FIELD

The invention relates to a kitchen scale and more particularly to kitchen scale having a carrying plate, a substructure supporting the carrying plate, and at least one weighing cell having at least one strain gauge.

BACKGROUND

In particular, the invention relates to a kitchen scale comprising a carrying plate, an in particular shell-type substructure which supports the carrying plate, weighing cells, which are interconnected between the force flow from the carrying plate to the substructure and have at least one strain gauge, which is deformed by the deformation of the weighing cell as a result of a load resting on the carrying plate, an electronics unit, which is capable of computing the weight of the load from the degree of the deformation of the weighing cells, and a display device for displaying the ascertained weight and a battery compartment for accommodating a voltage source which supplies the electronics unit with power, wherein the kitchen scale is designed as an open kitchen scale having a gap between the carrying plate and the substructure, so that water and/or moisture can penetrate through the gap into the kitchen scale and can exit from the kitchen scale, and the electronics unit and also the display device are encapsulated so as to be watertight, the carrying plate and the substructure, with the exception of the battery compartment and the encapsulated electronics unit, do not have cavities, and the battery compartment is sealed against penetrating water.

The typical kitchen scales have supporting feet below the carrying plate, via which they stand on an underlying surface. Weighing cells are then provided in the region of the connection of the supporting feet or in the supporting feet themselves. These weighing cells are deformable strain gauges, wherein the electronics unit is capable of determining the weight resting on the carrying plate via the deformation, in particular using a measurement bridge.

Another embodiment of a kitchen scale has a rather shell-like or flat substructure, wherein the weighing cells are arranged between the carrying plate and the substructure. A gap exists here between the substructure and the carrying plate, which is compressed because of the deflection of the carrying plate. The electronics unit is typically arranged in this case on the substructure, but can also be provided on the carrying plate. This also applies to the display device.

These kitchen scales have the disadvantage that they are not liquid-tight. Liquid typically cannot enter the scale during normal use in a kitchen, but the scale cannot be cleaned under running water or even in a dishwasher.

Experiments have therefore been made in designing a kitchen scale so as to be completely closed, so that it is watertight, as is known, for example, of electrical toothbrushes. Because the weighing cells have to be deflected in relation to the remaining regions of the kitchen scale due to relative movement of the carrying plate, however, a housing closed all around can only be implemented with difficulty. In particular in the region of the weighing cells, however, moisture interferes and corrupts the measurement result. This is an obstacle in particular in the field of the kitchen scales, since they typically have to have an accuracy of, for example, 1 g.

In addition, it has been shown that in spite of all efforts, a complete moisture tightness can hardly be implemented.

Kitchen scales of the type mentioned at the outset are known from DE 10 2011 051 612 A1. These kitchen scales have supporting feet below the carrying plate, via which they stand on an underlying surface. Weighing cells are then provided in the region of the connection of the supporting feet or in the supporting feet themselves. These weighing cells have strain gauges which are deformable together with the deformation of the weighing cells, wherein the electronics unit is capable of determining the weight resting on the carrying plate via the deformation of the strain gauges.

The kitchen scale has a shell-type or flat substructure, wherein the weighing cells are arranged between the carrying plate and the substructure. A gap exists here between the substructure and the carrying plate, which can be compressed, but not closed, as a result of the deflection of the carrying plate. The electronics unit is arranged in this case on the substructure, but can also be provided on the carrying plate. This also applies to the display device.

These dishwasher-suitable kitchen scales have the disadvantage that they are not liquid-tight and therefore rinsing water and contaminants or foreign bodies can penetrate into the interior of the kitchen scale. The electronics unit and the battery compartment are protected against moisture, but the weighing cells can become wet in the region of the strain gauges and can be damaged by chemical influences of the detergent or by mechanical impacts of the foreign bodies. Finally, even an increased ambient humidity, and certainly water wetting, considerably interferes with the measurement.

A weighing cell, inter alia, for weighing purposes is known from US 2005/0155435 A1, which has protection from water, in particular formed by a polymer coating, in the region of the strain gauges. This coating is watertight and comparatively costly, so that this expenditure is only worthwhile in conjunction with costly industrial scales. Household scales are under a high cost pressure, however, so that such a watertight coating is not possible here. Furthermore, the coating cannot influence the measurement accuracy.

SUMMARY

The object of the invention is therefore to refine a kitchen scale such that it can be cleaned under running water, immersed under water, or in a dishwasher and is subsequently ready for use again as rapidly as possible.

This object is achieved according to the invention in that the kitchen scale is designed as an open kitchen scale, wherein a joint-like gap is provided between the carrying plate and the substructure, through which water and/or moisture can penetrate into the kitchen scale and can exit from the kitchen scale, and the weighing cell has at least one strain gauge, which is at least partially provided with a parylene coating.

Parylenes are plastics which are hydrophobic and chemical-resistant. They have a good protection from inorganic and organic media, strong acids, bases, gases, and water vapor and are therefore capable of protecting the materials coated therewith from influences in a dishwasher or in a washbasin. As a thin and transparent coating having high gap penetration, they are suitable for complexly designed substrates, so that in addition to the weighing cells, the printed circuit board of the electronics unit can also be coated and protected using them.

Since parylenes are created by chemical gas phase deposition and therefore do not form an edge loss, they are also suitable because of the good dielectric properties thereof, with high voltage resistance and low dielectric constant, for permanently protecting the exposed weighing cells and possibly also the electronics unit.

For the construction of a dishwasher-safe scale, the entire electronics unit and all weighing cells can be completely provided with the parylene coating. Alternatively, the electronics unit can also be encapsulated, for example arranged in a welded plastic housing.

The thickness of the parylene coating can preferably be up to 1 mm, in particular the thickness can be between 0.01 and 0.5 mm. Such layer thicknesses may be achieved easily using the special production methods of parylene coating.

For the coating, alternatively so-called:
parylene N having the structural formula:

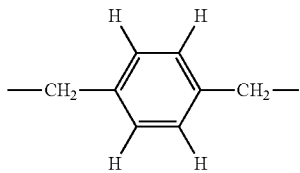

parylene C having the structural formula:

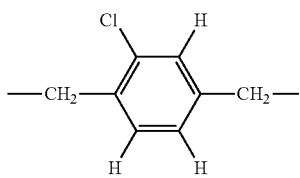

parylene D having the structural formula:

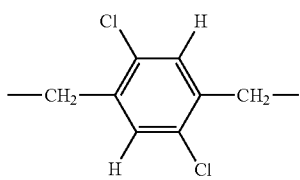

parylene HT having the structural formula:

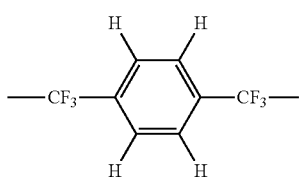

can be used.

The parylene N coating is a coating made of the hydrocarbon poly-p-xylylene. Parylene C, parylene D, or parylene HT coatings are coatings made of halogenated polymers, as is recognizable from the structural formulas shown above.

Parylene N coatings have the advantage that they are capable of penetrating very well into gaps. They are therefore particularly suitable with respect to the gap sealing. The halogenated polymers also penetrate quite well, although somewhat worse in comparison to the parylene N coatings, into gaps, but have the advantage of greater moisture tightness and higher temperature resistance in particular in the case of the parylene D coating.

Parylene HT coatings in turn have outstanding gap penetration and are temperature resistant up to 450° C. Finally, all parylene coatings are therefore fundamentally suitable for protecting the electronics unit and the weighing cells of a scale. The specific material selection will then be dependent on the particular usage conditions.

Alternatively, of course, a combination of the properties can be used in that the parylene coating is in turn coated by a further parylene coating. A first coating having high gap penetration can thus be applied in particular in the region of a printed circuit board, more or less as a sealing primer, while a cover layer having improved barriers against liquid penetration or higher temperature resistance causes the final property. The coating, even if it also consists of multiple parylene coatings, can also be covered by a mechanical protective layer, which protects the thin parylene coating from mechanical influences in the dishwasher. This mechanical protective layer can consist, for example, of a silicone or a nitrile-butadiene rubber (NBR).

The electronics unit can also be coated using parylene, but alternatively (or additionally as a double layer), it can be encapsulated and thus secured against moisture, in particular against liquid water.

The region between the carrying plate and the substructure is intentionally kept open, in particular if the substructure is provided in the form of a plate or flat shell, so that cleaning water and in one possible embodiment even solids, which are present, for example, in a dishwasher or a kitchen sink, can reach between the two components. The invention presumes that these liquid quantities drain off again after the cleaning process and the damp components can dry out again comparatively rapidly, so that operational readiness is established again after the drying procedure.

Solids penetrating into the scale can be flushed out again during the rinsing process due to the open embodiment. Because, in one possible embodiment, the electronics unit is embedded using conventional materials, for example, a silicone, it is protected against penetrating water. Because experience has shown that these materials are not capable, however, of avoiding vapor permeability, according to the invention, it is intentionally accepted that moisture can penetrate into the electronics unit and subsequently has to dry out again.

The weighing cells are also provided with a coating in the sensitive region, i.e., the region in which the strain gauges deform. This coating is preferably kept thin, so that it can dry out rapidly. Due to the open construction of the scale, the concentration difference between the damp components and the surrounding air regions can be kept large, since moisture escaping from the electronics unit and the coating of the weighing cells is dissipated rapidly. This is advantageous in particular if the still damp scale is stored in the refrigerator, for example, so that the diffusion processes are slowed by the low temperatures present therein.

While in the comparatively hot environment of a dishwasher, the diffusion into the electronics unit and the material of the coating of the weighing cells is promoted by the high temperatures, subsequently, during the storage of the scale, the degree of diffusion decreases due to the temperatures, which are then lower. The option does exist during the drying in the dishwasher of using the high temperatures then present, but a predominantly damp atmosphere prevails here, so that the moisture concentration in the surrounding air substantially compensates for this effect.

Strain gauges typically have high required insulation resistances of >100 MOhm. They are reduced by the water absorbency of the coating to an unusable amount. Furthermore, of course, in the case of the damp coating of the electronics unit, a fault current or short circuit can occur, which makes a correct measurement impossible.

The electronics unit is therefore, on the one hand, adapted to the fact that a damp environment could possibly be present. This adaptation consists, for example, of the conductor tracks of the electronics unit having an increased distance from one another in comparison to conventional scales, wherein this distance is doubled, for example, and in one possible embodiment of the invention is greater than 1 mm.

Furthermore, the electrical connections between the weighing cells and the electronics unit, which typically has a main printed circuit board having a measurement amplifier arranged thereon, are preferably not formed by cables which are enclosed by leads, but rather as open conductors, which can dry out more rapidly. Lines made of enameled copper wire without cladding can be used here, for example.

Furthermore, the electronics unit has protection from incorrect measurements by being capable of directly or indirectly determining the moisture. A direct determination takes place via moisture sensors, which are short-circuited by a certain degree of the moisture, for example. Since such sensors cannot be used everywhere and increase the measurement expenditure, one preferred embodiment of the invention uses the sensor system provided in any case. In this case, the measurement bridge is used to determine the quality of the measurement.

The drying state is determined by the observation of the drift of the zero point of the measurement bridge. Drifting away of the zero point of the tuned measurement bridge indicates excessively damp measurement points in the weighing cells in this case. The detuning of the measurement bridge in the zero point is thus a reliable sign of the present uselessness of the measurement system.

The electronics unit can check whether the scale is capable of reliably ascertaining the weight. This can take place upon an attempt to turn it on, furthermore, this can also take place after the turning-on or also in the idle state. The check, if it is not an initial check during the attempt to turn it on, can be performed continuously or at specific intervals, for example, 1 to 10 times per second. In the event of a positive check, the electronics unit switches into the ready mode and ascertains the weight resting on the carrying plate. In the event of a negative check, an error message or a display "please wait" is preferably output or the scale will simply not turn on.

Scales are presently frequently turned on and off via touch-sensitive sensors. Such sensors react to the change of the electrical field in the vicinity of an electrode. Of course, this can also take place in the kitchen sink or in the dishwasher, so that the hazard exists that the scale will be turned on unintentionally. This results in a reduction of the operating duration, which is obviously undesirable.

One preferred embodiment of the scale therefore uses an additional sensor, which establishes a state in which the scale is typically not to be turned on and then suppresses the turning-on. This can be, for example, a light sensor, which establishes that the scale is in a dark space. This is certainly the case in a dishwasher, such that turning it on using the capacitive sensor can be prevented therein. During cleaning in a kitchen sink, this is usually not critical, since the scale only remains a very short time in this sink, so that the additional power consumption is tolerable.

Instead of the optical sensor, any other sensor can also be used which can detect the critical storages or states. This can be, for example, a temperature sensor, which establishes the typically higher temperatures in the washing environment, in particular the dishwasher.

Furthermore, it can also have a combination of capacitive sensor and auxiliary sensor, wherein then both sensors have to be actuated. This can take place via a shared keypad. Thus, either an optical sensor or a temperature sensor, which measures a temperature difference between a panel on which the user has to place their finger, and the ambient regions, together with the signal of the capacitive sensor, can be used as a switch impulse. In both cases, it is improbable that such a combination sensor will be triggered in the dark dishwasher or underwater.

The carrying plate and the substructure are constructed such that penetrating water can drain off as rapidly as possible. Although, for example, a shell-type substructure will be concavely curved, it is preferably formed sufficiently flat that the water can easily drain off when the scale is standing in the dish rack of a dishwasher. A further preferred embodiment has a carrying plate which is detachably connected to the substructure. In this embodiment, the user can optimize the water drainage still further by placing the carrying plate separately from the substructure in the dishwasher.

With a removable carrying plate, the user subsequently has to reassemble the scale. This can take place via plug connections in the form of two-part support elements, wherein an upper part is provided on the carrying plate and a lower part is provided on the substructure, which are connected to one another. The scale will have at least three, preferably four of these pairs, so that it is possibly not entirely simple to assemble the scale correctly.

One particularly preferred refinement therefore has a magnetic connection between the carrying plate and the substructure. Multiple magnets are provided both on the carrying plate and also on the substructure here, which partially repel and partially attract one another. The magnets are arranged such that the repulsion forces and the attraction forces automatically center the carrying plate above the substructure. After this automatic centering, the attraction forces can then hold the carrying plate on the substructure. In a further embodiment of this invention, the magnets are provided directly on the weighing cells, which are then arranged between two magnets or two magnet clusters, which are each provided on the carrying plate and on the substructure.

Another embodiment of the scale has one or more seals against solids or also against liquid water. A seal against liquid water does not necessarily have to hold back any amount of liquid, but rather only has to reduce the penetration of liquid to achieve a positive effect. Such a seal can be formed, for example, by a screen, which closes the gap between the carrying plate and the substructure. This elastic screen can be manufactured from plastic, for example, and can have a mesh width which prevents the passage of liquid or makes it more difficult. A liquid-repellent surface, such as that offered by plastics, in particular PET, for example, can additionally improve this effect.

The screen is to have a mesh width of less than 1 mm and be waterproof. Furthermore, it is to keep the mechanical tension between carrying plate and substructure as low as possible, i.e., the movement joint should advantageously close without absorbing mechanical tension. Advantageously, the screen is positioned at a right angle to the movement direction of the carrying plate. A pronounced waveform of the screen can additionally reduce the stiffness, to thus further reduce the mechanical tension. Furthermore, the screen can only be fastened on one side, for example, on the carrying plate or on the substructure.

If the mesh width of the screen is selected so as to be very small, for example less than 0.5 mm, it can happen that water does penetrate in the dishwasher, but it can no longer drain off because of the small mesh width and the hydrophobic effect of the surface. Of course, this is not desired. For this purpose, a water drain can be provided in the region of the bottom of the substructure, via which the water can drain off in spite of the screen. Furthermore, of course, the screen itself can have intentionally introduced passage openings as a water drain, wherein it is then formed in this case so that water flows within the transverse scale in the region of these passage openings.

The screen can be made hydrophobic or hydrophilic as desired. A hydrophobic screen, in particular having a small mesh width, has the advantage that little water can flow into the interior of the open scale. On the other hand, the water which nonetheless enters thus also cannot drain off as easily. A hydrophilic screen in turn has the advantage that liquid can easily drain off through the screen.

To improve the drainage behavior, the water in the scale can also be admixed with a material, in particular a soap, which additionally reduces the liquid tension. A soap pad which is continuously consumed can be used here, for example.

Alternatively to a screen, membranes or similar means, such as labyrinth seals without a friction lock, can also be used. Furthermore, membranes are possible which change the shape thereof in the event of water contact and thus temporarily close the movement gap between the carrying plate and the substructure. These membranes then rebound during the subsequent drying procedure, so that the friction lock is removed again.

Finally, it is also possible to cover the substructure using a net, which is arranged parallel to the carrying plate and is fixedly connected at the sides to the substructure. This net can then be formed, for example, so that the two-part support elements clamp the net between them, wherein the net is laid loosely over the substructure to such an extent that in this way a friction lock is avoided or at least significantly reduced. Such a net can hold back solids and also liquids to a certain extent, like the screen which covers the joint between carrying plate and substructure, so that, for example, baking-on of drying solids is avoided and at the same time the quantity of the water which has to drain off again later is reduced. This net can also be made hydrophobic, the mesh widths can also be less than 1 mm here.

Alternatively to the parylene coating, a coating made of a nitrile rubber, in particular a nitrile-butadiene rubber (NBR) having an acrylonitrile proportion between 18 and 50% can also be used. In this case, the acrylonitrile proportion is decisive for the temperature resistance of the coating 9. To achieve a high temperature resistance, an acrylonitrile proportion in the lower range of the above-mentioned range is preferably selected, for example an acrylonitrile proportion of less than 30%, in particular less than 25%. Alternatively, a hydrogenated nitrile-butadiene rubber (HNBR) can also be used, in which the double bonds of the nitrile-butadiene rubber are broken in favor of single bonds by the hydrogenation. A styrene-butadiene rubber or gutta-percha can also be used to form the coating 9. This coating is not moisture-tight and preferably has a thickness of up to 1 mm.

Further features and advantages of the invention result from the dependent claims and from the following description of preferred exemplary embodiments on the basis of the drawings.

DRAWINGS

Figure 2:
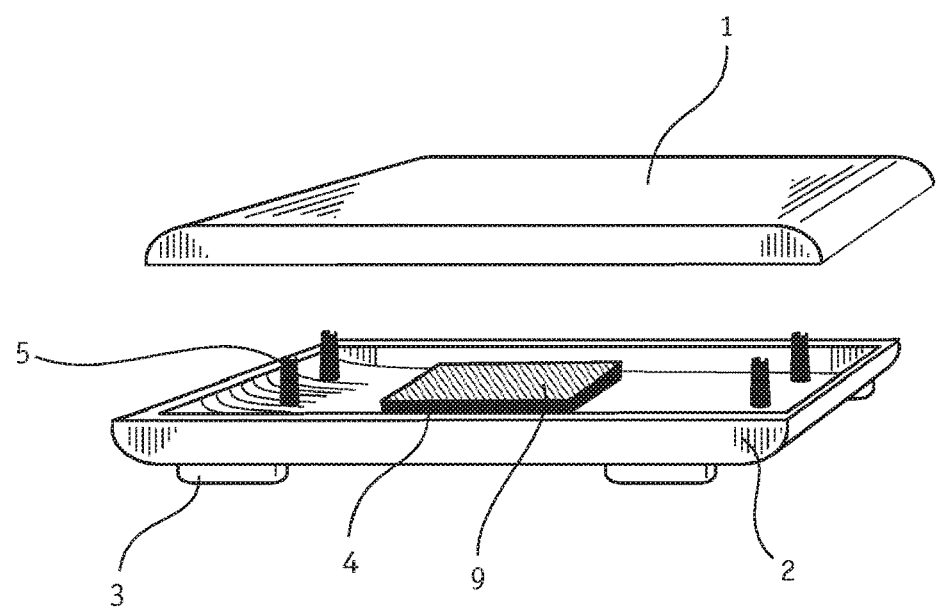
Figure 3:
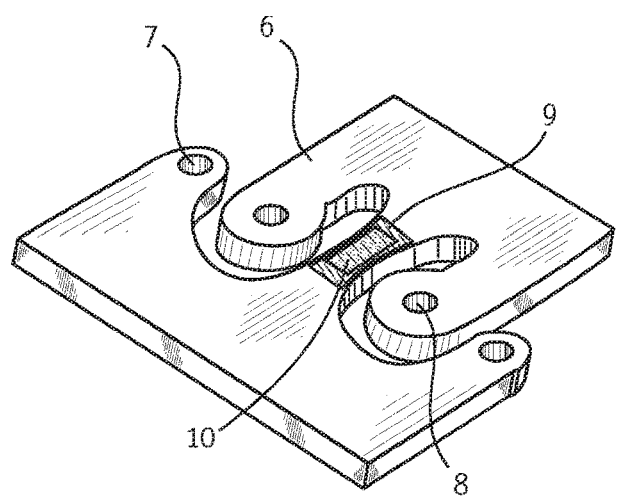

In the figures of the drawing:

FIG. 1 shows an exemplary embodiment of a kitchen scale according to the invention, FIG. 2 shows the kitchen scale illustrated in FIG. 1 in an exploded illustration, and FIG. 3 shows an example of a weighing cell comprising a coating according to the invention in the region of the strain gauge.

DESCRIPTION

FIG. 1 schematically illustrates an embodiment of a scale according to the invention. The substructure 2 is formed here in the form of a flat pan, wherein the carrying plate 1 is supported on weighing cells, which are provided in the substructure 2, via support elements 5. Alternatively, of course, the weighing cells can also be arranged at the upper end of the support elements 5. The substructure 2 stands via supporting feet 3 on a surface.

As is apparent from FIG. 2, the scale has an electronics unit 4 in the interior. The electronics unit 4 is shown in black here for visual identification of the liquid-tight, but vapor-permeable encapsulation. Such an electronics unit 4 is typically at least one printed circuit board, on which electrical components are arranged and are connected to one another via conductor tracks. These components and the conductor tracks are preferably encapsulated using silicone.

The electronics unit 4 is in turn connected to the weighing cells via open conductor tracks in the form of enameled copper, which can dry off very rapidly. To avoid fault currents, the distance of the conductor tracks in relation to one another is enlarged relative to conventional scales (not visible here).

Due to the embodiment according to the invention of the two-part scale here having removable carrying plate 1, liquid and moisture can enter the scale, which is tolerated according to the invention, however, since liquid can immediately drain off again and moisture can dry off rapidly due to the open construction of the scale. Since typically scales are not cleaned in a dishwasher between each weighing process, but rather only at the end of the use, the required duration of the drying of the electrical elements which have become damp due to diffusion is not relevant in practice.

A weighing cell 6 of one possible embodiment of a kitchen scale according to the invention is illustrated in an enlarged view in FIG. 3. The weighing cell 6 has a front section, which is connected to the lower shell via two fastening boreholes 7 on the lower shell side. A rear region is connected to the carrying plate 1 via two fastening boreholes 8 on the carrying plate side. A strain gauge 10 is arranged in the transition region between the front and the rear regions.

The strain gauge 10 is elongated by the bending of the weighing cell, the change of the resistance corresponding thereto is then used by the electronics unit 4 connected to the strain gauge 10 to determine the weight of the load resting on the carrying plate 1. This essentially corresponds to the structure of the weighing cells 6 of the known kitchen scales.

The strain gauge 10 is then provided with a coating 9, which is formed as a parylene coating. The coating is not moisture-tight and preferably has a thickness of up to 1 mm. It has the advantage that it protects the strain gauge 10 from mechanical influences in a dishwasher or in a kitchen sink, but is easy to apply as permanent protection, without corrupting the measurement.

LIST OF REFERENCE SIGNS 1 carrying plate
2 substructure
3 supporting foot
4 electronics unit
5 support elements
6 weighing cell
7 fastening borehole on lower shell side
8 fastening borehole on carrying plate side
9 coating of the strain gauge
10 strain gauge

The invention claimed is:

1. A kitchen scale comprising a carrying plate, a substructure supporting the carrying plate, and at least one weighing cell having at least one strain gauge, which is deformed by a load resting on the carrying plate, an electronics unit, which is capable of computing the weight of the load from the degree of the deformation of the weighing cells, and comprising a display device for displaying the ascertained weight and a battery compartment for accommodating a voltage source which supplies the electronics unit with power, wherein the kitchen scale is designed as an open kitchen scale having a gap between the carrying plate and the substructure, so that water and/or moisture can penetrate through the gap into the kitchen scale and can exit from the kitchen scale, and the electronics unit and the display device are encapsulated in a moisture-tight and watertight manner and also the battery compartment is sealed against penetrating water, wherein the weighing cell is provided with a coating formed as a parylene coating at least in the region of the strain gauge,
wherein the electronics unit has moisture sensors, which are capable of ascertaining the moisture of the coating of the weighing cells, wherein the electronics unit is designed such that a measurement is not carried out above a predefined threshold value.

2. The kitchen scale as claimed in claim 1, wherein the electronics unit has at least one printed circuit board which is provided with a parylene coating.

3. The kitchen scale as claimed in claim 2 comprising at least two weighing cells, characterized in that the entire electronics unit and all weighing cells are completely provided with the parylene coating.

4. The kitchen scale as claimed in claim 1, wherein the parylene coating has a thickness of up to 1 mm.

5. The kitchen scale as claimed in claim 1, wherein the parylene coating is an inert and hydrophobic polymer coating.

6. The kitchen scale as claimed in claim 1, wherein the parylene coating is a coating made of the hydrocarbon poly-p-xylylene (parylene N).

7. The kitchen scale as claimed in claim 1, wherein the parylene coating is a coating made of halogenated polymers.

8. The kitchen scale as claimed in claim 1, wherein the electronics unit and the weighing cells are provided at least in sections with a double or multiple parylene coating, wherein each of the parylene coatings is a coating selected from the group of comprising parylene N, parylene C, parylene D and parylene HT.

9. The kitchen scale as claimed in claim 1, wherein the parylene coating is provided with an additional coating, comprising an elastic, liquid-tight, and vapor-permeable protective layer, which is capable of protecting the parylene coating from mechanical effects and in particular is formed by a silicone or a nitrile-butadiene rubber (NBR).

10. The kitchen scale as claimed in claim 1, wherein the carrying plate is detachably connected to the substructure.

11. The kitchen scale as claimed in claim 1, wherein the battery compartment is formed so as to be watertight, comprising a hermetically sealing housing wall which completely encloses the battery compartment.

12. The kitchen scale as claimed in claim 1, wherein the electronics unit is encapsulated using a potting compound, which is liquid-tight and vapor-permeable and is formed by a silicone or a nitrile-butadiene rubber (NBR).

13. The kitchen scale as claimed in claim 10, wherein the half-shell forming the substructure is covered by a tight-meshed net to hold back solids, wherein the net has a mesh width of less than 1 mm and has hydrophobic surface properties.

14. The kitchen scale as claimed claim 10, wherein the net is fixedly connected to the half-shell at the edges and rests loosely on the half-shell in the middle region, wherein the support elements are formed in two parts having an upper region connected to the carrying plate and a lower region connected to the half-shell and wherein the lower and the upper regions of the support elements clamp the net between them.

15. The kitchen scale as claimed in claim 1, wherein the electronics unit and the display device below the carrying plate are arranged thereon, wherein the substructure is formed by at least three, preferably four supporting feet, which are connected via the weighing cells to the carrying plate and wherein the display device is encapsulated in a watertight manner with the carrying plate using a potting compound.

16. The kitchen scale as claimed in claim 1, wherein the joint gap between substructure and carrying plate is closed via an elastic screen, which is arranged perpendicularly to the movement direction of the carrying plate, wherein the screen has a mesh width of less than 1 mm and is preferably manufactured from plastic.

17. The kitchen scale as claimed in claim 1, wherein the substructure and the carrying plate are connected to one another via a detachable magnetic connection.

18. The kitchen scale as claimed in claim 1, wherein at least three pairs of magnets arranged adjacent to one another are provided both on the carrying plate and also on the substructure, wherein the magnets are arranged so that the carrying plate is automatically centered on the substructure during the assembly by the attraction force and/or repulsion force of the individual magnets.

19. A kitchen scale comprising a carrying plate, a substructure supporting the carrying plate, and at least one weighing cell having at least one strain gauge, which is deformed by a load resting on the carrying plate, an electronics unit, which is capable of computing the weight of the load from the degree of the deformation of the weighing cells, and comprising a display device for displaying the ascertained weight and a battery compartment for accommodating a voltage source which supplies the electronics unit with power, wherein the kitchen scale is designed as an open kitchen scale having a gap between the carrying plate and the substructure, so that water and/or moisture can penetrate through the gap into the kitchen scale and can exit from the kitchen scale, and the electronics unit and the display device are encapsulated in a moisture-tight and watertight manner and also the battery compartment is sealed against penetrating water, wherein the weighing cell is provided with a coating formed as a parylene coating at least in the region of the strain gauge, wherein the electronics unit has a measurement bridge for ascertaining the weight, wherein the electronics unit ascertains the moisture which has penetrated therein by ascertaining the drift behavior of the zero point and, in the event of drifting away of the zero point, presumes an excessively damp state and does not carry out a measurement.

20. A kitchen scale comprising a carrying plate, a substructure supporting the carrying plate, and at least one weighing cell having at least one strain gauge, which is deformed by a load resting on the carrying plate, an electronics unit, which is capable of computing the weight of the load from the degree of the deformation of the weighing cells, and comprising a display device for displaying the ascertained weight and a battery compartment for accommodating a voltage source which supplies the electronics unit with power, wherein the kitchen scale is designed as an open kitchen scale having a gap between the carrying plate and the substructure, so that water and/or moisture can penetrate through the gap into the kitchen scale and can exit from the kitchen scale, and the electronics unit and the display device are encapsulated in a moisture-tight and watertight manner and also the battery compartment is sealed against penetrating water, wherein the weighing cell is provided with a coating formed as a parylene coating at least in the region of the strain gauge wherein the substructure is designed as a flat half-shell having at least three support elements which support the carrying plate, wherein the support elements are supported on the weighing cells.

* * * * *